US012804557B2

(12) United States Patent
Kamisawa et al.

(10) Patent No.: US 12,804,557 B2
(45) Date of Patent: Nov. 17, 2026

(54) MEASUREMENT DEVICE AND A MEASUREMENT METHOD

(71) Applicant: ANRITSU CORPORATION, Atsugi (JP)

(72) Inventors: Takaaki Kamisawa, Atsugi (JP); Yuriko Takaishi, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 333 days.

(21) Appl. No.: 18/785,311

(22) Filed: Jul. 26, 2024

(65) Prior Publication Data

US 2025/0048276 A1 Feb. 6, 2025

(30) Foreign Application Priority Data

Aug. 1, 2023 (JP) ................................ 2023-125741

(51) Int. Cl.
*H04W 52/34* (2009.01)
*H04B 17/14* (2015.01)

(52) U.S. Cl.
CPC .......... *H04W 52/346* (2013.01); *H04B 17/14* (2015.01)

(58) Field of Classification Search
CPC ............................ H04W 52/346; H04B 17/14
See application file for complete search history.

(56) References Cited

U.S. PATENT DOCUMENTS

2022/0312211 A1* 9/2022 Arai ...................... H04W 12/50
2023/0045847 A1* 2/2023 Wong ..................... H04B 7/086
2023/0046743 A1* 2/2023 Vaez-Ghaemi .... H04B 10/0799
2023/0083011 A1* 3/2023 Krishnan ............ H04B 17/327
455/423

FOREIGN PATENT DOCUMENTS

JP 2022150683 A 10/2022
WO 2021019631 A1 2/2021

* cited by examiner

*Primary Examiner* — David Bilodeau
(74) *Attorney, Agent, or Firm* — Greer Burns & Crain Ltd.

(57) ABSTRACT

The measurement device that measures the performance of an O-RU constituting a base station of an O-RAN that performs orthogonal frequency division multiplexing radio communication includes: an O-DU Emulator that emulates the O-DU of the base station and transmits IQ packets for DL test to the O-RU through the fronthaul; a power measurement instrument that measures the power per one subcarrier and the total power of all subcarriers that measures the power of the RF signal generated and outputted based on the IQ packet received by the O-RU; a control unit that calculates the IQ power level per one subcarrier in the IQ packet based on the set value of the total IQ power level of all subcarriers in the IQ packet; and a display unit that displays the IQ power level per one subcarrier calculated by the control unit.

24 Claims, 7 Drawing Sheets

MEASUREMENT DEVICE AND A MEASUREMENT METHOD

FIELD OF THE INVENTION

The present invention relates to a measurement device and a measurement method, particularly to a measurement device and a measurement method to measure a performance of an O-RU constituting O-RAN, Open RAN in a broad sense.

BACKGROUND ART

In the RU (Radio Unit), DU (Distributed Unit), and CU (Central Unit) that constitute the 5G RAN (Radio Access Network), communication interfaces between devices differ depending on the vendor, and it has been difficult to constitute a RAN by combining devices from different vendors. To solve this problem, based on the Open RAN concept, which makes the specifications of base stations open and standardized, the O-RAN (Open-Radio Access Network) has been proposed in these years as an open radio access network that standardizes the specifications of communication interfaces between devices.

Each vendor that supports the O-RAN needs to develop devices that comply with the O-RAN standards established by the O-RAN Alliance and to conduct an interconnectivity test of the devices provided by different vendors, and communication carriers need to conduct a test of a network constituted by a combination of those devices (for example, see Patent Document 1).

To be specific, in O-RAN, the base station is constituted by an O-DU (O-RAN Distributed Unit) and an O-RU (O-RAN Radio Unit), and an interface (IF) between the O-DU and the O-RU includes a C (Control) plane, a U (User) plane, an S (Synchronization) plane, and an M (Management) plane. In the case that the DL (Downlink) signal is transmitted from the base station to the UE (User Equipment), the power level of the RF signal outputted from the base station is determined in the amplitude level of the IQ (In Phase, Quadrature Phase) signal transmitted from the O-DU to the O-RU in the U plane, and the DL gain of the O-RU transmitted in the M plane (for example, see Patent Document 2). The amplitude level of the IQ signal is set based on the IQ power level. In detail, the relationship between the amplitude level of the IQ signal and the IQ power level is power (power)=amplitude×amplitude, and when the amplitude level of the IQ signal is determined, the power is also determined.

When conducting a conformance test for O-RAN standards such as WG4.CONF.0-R003-v07.00, 3 Conformance Measurements with an O-RU as a DUT (Device Under Test), in order to confirm that the power of the RF signal output from the O-RU is appropriate, it is necessary to confirm the amplitude level of the IQ signal transmitted from the O-DU in the U plane and the gain information transmitted in the M plane and the actual power of the RF signal outputted from the O-RU.

CITATION LIST

Patent Literature

[Patent Document 1] Japanese Patent Application Publication No. 2022-150683
[Patent Document 2] International Publication No. WO2021/019631

SUMMARY OF THE INVENTION

Technical Problem

However, when conducting a conformance test using an O-RU as a DUT, if the power of the RF signal transmitted from the O-RU is not the expected power, it is necessary to distinguish whether the defect is caused by the O-RU, which is the DUT, or the defect is caused by the settings on the measurement device side. At this time, when investigating the IQ signal sent from the O-DU of the measurement device to the O-RU, it is necessary to know the power value of the IQ signal inside the IQ packet, however, since the power of the IQ signal is determined by the IQ power level set in the O-DU and several setting parameters, it is necessary to perform calculations one by one using them, which is complicated (Problem 1).

Further, 5G and LTE use a modulation method called OFDM (Orthogonal Frequency Division Multiplexing). OFDM is a modulation method in which narrowband signals of subcarriers are orthogonally multiplexed in the frequency direction. In the O-RAN standard, in addition to the 5G standard, there exists a condition that the maximum value of one subcarrier signal must be 0 [dBFS] or less. In the power calculation, there are a case in which the power is calculated using the total power on all the subcarriers and a case in which the power is calculated by one subcarrier. The power of the IQ packet inputted to the O-RU is set for each one subcarrier. Therefore, it was necessary to calculate not only the total power level of all the subcarriers in the IQ packet input to the O-RU, but also the IQ power level per each one subcarrier. Further, if it is not possible to clearly distinguish whether the power of IQ packets input to the O-RU is the power per one subcarrier, which is the unit defined in the standard, or the total power of all subcarriers and check both, the efficiency of debugging the DUT was inefficient because it was difficult to ascertain that the power of the IQ packets met the value set as an upper limit based on the suitability or standard of the power of the RF signal output from the O-RU (Problem 2).

In addition, TER (Test Equipment, RU), which is a measurement device that uses an O-RU as DUT, is constituted by combining a C/U/S/M Plane Emulator, a power measurement instrument that measures the power per one subcarrier and the total power of all the subcarriers, and a signal generator. When TER is constituted by with plurality of devices, it is necessary to confirm the display of power on each device, making the confirmation work complicated (Problem 3).

The present invention has been made in order to solve such conventional problems, and the object of the present invention is to provide a measurement device and a measurement method capable of efficiently debugging a DUT when conducting a performance test such as O-RAN standard conformance test.

Means to Solve Technical Problem

In order to solve the above problems, the measurement device according to the present invention is a measurement device that measures performance of an O-RU (O-RAN Radio Unit) that constitutes a base station of an Open RAN (Open Radio Access Network) that performs orthogonal frequency division multiplexing radio communication, the measurement device including: an O-DU Emulator (12) that emulates an O-DU (O-RAN Distributed Unit) of the base station and transmits IQ packets for downlink test to the O-RU through a fronthaul; a power measurement instrument (14) that measures power per one subcarrier and total power of all subcarriers of an RF signal generated and outputted based on the IQ packet received by the O-RU; a control unit (10) that calculates an IQ power level per one subcarrier in the IQ packet based on a set value of total IQ power level of all the subcarriers in the IQ packet; and a display unit (20) that displays the IQ power level per one subcarrier calculated by the control unit.

As described above, in the measurement device according to the present invention, in the DL test, the control unit is configured to calculate the IQ power level per one subcarrier in the IQ packet based on the set value of the total IQ power level of all the subcarriers in the IQ packet, and the display unit is configured to display the calculated value of the IQ power level per one subcarrier. In the DL test, in the case that the measurement value of the power of the RF signal transmitted from the O-RU is not equal to the estimated value of the power level of the RF signal obtained based on the set value of the total IQ power level, it is necessary to investigate the cause. At that time, it is necessary to determine whether the cause of the defect (bug) is on the O-RU (DUT) side or on the measurement device side. The O-DU Emulator of the measurement device transmits data for DL test by the IQ packet to the O-RU, which is the DUT, through the fronthaul, and it is necessary to confirm whether or not the IQ packet is normal. In the IQ packet, the IQ data is specified for each subcarrier. Therefore, in order to confirm whether the IQ packet is normal or abnormal, it is necessary to confirm not only the total IQ power level of all the subcarriers in the IQ packet, but also the IQ power level per one subcarrier in the IQ packet, so that the cause of a defect (bug) can be identified quickly and reliably. By this, it is possible to efficiently debug the DUT when conducting a performance test such as O-RAN standard conformance test.

Further, the measurement device of the present invention is a measurement device that measures performance of an O-RU that constitutes a base station of an Open RAN (Open Radio Access Network) that performs orthogonal frequency division multiplexing radio communication, the measurement device including: a signal generator (16) that generates an RF signal for an uplink test to be transmitted to the O-RU; a power measurement instrument (14) that measures power per one subcarrier and total power of all subcarriers of the RF signal generated by the signal generator; an O-DU Emulator (12) that emulates the O-DU of the base station and receives the IQ packets from the O-RU that generated IQ packet based on the RF signal through a fronthaul; a control unit (10) that calculates a total IQ power level of all subcarriers in the IQ packet based on information of the IQ packet received by the O-DU Emulator and calculates an IQ power level per one subcarrier in the IQ packet based on the total IQ power level; and a display unit (20) that displays the IQ power level per one subcarrier calculated by the control unit.

As described above, in the measurement device according to the present invention, in an uplink (UL) test, the control unit is configured to calculate the total IQ power level of all the subcarriers in the IQ packet based on the information in the IQ packet received by the O-DU Emulator, and calculate the IQ power level per one subcarrier in the IQ packet based on the total IQ power level, and the display unit is configured to display the calculated value of the IQ power level per one subcarrier. In the UL test, in the case that the measurement value of the power of the RF signal transmitted to the O-RU, obtained by a power measurement instrument that measures the power per one subcarrier and the total power of all subcarriers, is not equal to the estimated value of the power level of the RF signal received by the O-RU, which is calculated by the control unit, it is necessary to investigate the cause. At that time, it is necessary to determine whether the cause of the defect (bug) is on the O-RU (DUT) side or on the measurement device side. The O-DU Emulator of the measurement device transmits the data for UL test by the IQ packet to the O-RU, which is the DUT, through the fronthaul, and it is necessary to confirm whether or not the IQ packet is normal. In the IQ packet, the IQ data is specified for each subcarrier. Therefore, in order to confirm whether the IQ packet is normal or abnormal, it is necessary to confirm not only the total IQ power level of all the subcarriers in the IQ packet, but also the IQ power level per one subcarrier in the IQ packet, so that the cause of a defect (bug) can be identified quickly and reliably. By this, it is possible to efficiently debug the DUT when conducting the performance tests such as O-RAN standard conformance test.

Further, in the measurement device of the present invention, the display unit may be so configured to distinguish and display the total IQ power level in addition to the IQ power level per one subcarrier, and displays a value set as an upper limit based on a standard for the total IQ power level, together with the total IQ power level.

By this configuration, the measurement device according to the present invention, in the link test of the DUT, can easily determine whether or not the total IQ power level exceeds the value set as the upper limit, based on the standard without confusing the IQ power level per one subcarrier with the total IQ power level.

Further, in the measurement device of the present invention, the display unit may be so configured to display the IQ power level per one subcarrier, the total IQ power level, a value set as an upper limit based on the standard, a gain set in the O-RU, and the measurement value of the power of the RF signal obtained by a power measurement instrument that measures power per one subcarrier and total power of all subcarriers, collectively for each group related to input and output to the O-RU and measurement.

By this configuration, the measurement device according to the present invention can centrally manage and collectively systematically display information that has been dispersed among components of the measurement device, thereby making it possible to efficiently debug a DUT when conducting a performance test such as O-RAN standard conformance test.

Further, in the measurement device of the present invention, the control unit may be so configured to calculate an amplitude of the IQ signal included in the IQ packet, and the display unit displays the amplitude of the IQ signal calculated by the control unit.

By this configuration, the measurement device according to the present invention can more accurately identify the cause of the defect when the test result is not normal in the link test of the DUT, so that the DUT can be efficiently debugged.

Further, in the measurement device of the present invention, the control unit may be configured to calculate the sum of the total IQ power level of all the subcarriers in the IQ packet and a downlink gain set in the O-RU as an estimated value of the total power level of all the subcarriers of the RF signal transmitted from the O-RU, and the display unit may be configured to further display an estimated value of a total power level of all the subcarriers of the RF signal calculated by the control unit, together with the measurement value of the power of the RF signal obtained by the power measurement instrument that measures the power per one subcarrier and the total power of all subcarriers.

By this configuration, in the DL test, the measurement device according to the present invention can easily compare the estimated value of the total power level of all the subcarriers of the RF signal transmitted from the O-RU, which is calculated by the control unit, and the measurement value of the total power of the RF signal transmitted from the O-RU, which is measured by the power measurement instrument that measures the power per one subcarrier and the total power of all the subcarriers. By this, the success or failure of the DL test of the DUT can be easily confirmed from the viewpoint of power.

Further, in the measurement device of the present invention, the control unit may be so configured to calculate the difference obtained by subtracting the uplink gain set in the O-RU from the total IQ power level of all subcarriers in the IQ packet as an estimated value of total power level of all subcarriers of the RF signal received by the O-RU, and the display unit further displays an estimated value of a total power level of all the subcarriers of the RF signal calculated by the control unit, together with the measurement value of the power of the RF signal obtained by the power measurement instrument that measures the power per one subcarrier and the total power of all subcarriers.

By this configuration, in the UL test, the measurement device according to the present invention can easily compare the estimated value of the total power level of all the subcarriers of the RF signal received by the O-RU, which is calculated by the control unit, and the measurement value of the power of the RF signal transmitted to the O-RU, which is measured by the power measurement instrument that measures the power per one subcarrier and the total power of all the subcarriers. By this, the success or failure of the UL test of the DUT can be easily confirmed from the viewpoint of power.

Further, in the measurement device of the present invention, the control unit may be so configured to determine whether or not the measurement value of the power of the RF signal is equal to the estimated value of the total power level of all the subcarriers of the RF signal calculated by the control unit, and the display unit displays the result of the determination.

By this configuration, the measurement device according to the present invention can quickly and reliably determine the success or failure of the DUT link test from the viewpoint of power.

Further, the measurement method of the present invention is a measurement method that measures performance of an O-RU that constitutes a base station of an Open RAN (Open Radio Access Network) that performs orthogonal frequency division multiplexing radio communication, the measurement method including: a transmitting step that emulates an O-DU of the base station and transmits IQ packets for downlink test to the O-RU through a fronthaul; a measurement step that measures power of an RF signal generated and outputted based on the IQ packet received by the O-RU; a calculation step that calculates an IQ power level per one subcarrier in the IQ packet based on a set value of total IQ power level of all the subcarriers in the IQ packet; and a display step that displays the IQ power level per one subcarrier calculated by the calculation step on a display unit.

As described above, in the measurement method according to the present invention, in the DL test, the IQ power level per one subcarrier in the IQ packet is calculated based on the set value of the total IQ power level of all subcarriers in the IQ packet in the calculation step, and in the display step, the calculated value of the IQ power level per one subcarrier is displayed on the display unit. In the DL test, in the case that the measurement value of the power of the RF signal transmitted from the O-RU is not equal to the estimated value of the power level of the RF signal obtained based on the set value of the total IQ power level, it is necessary to investigate the cause. At that time, it is necessary to determine whether the cause of the defect (bug) is on the O-RU (DUT) side or on the emulated O-DU side. The emulated O-DU transmits the data for DL test by the IQ packet to the O-RU, which is the DUT, through the fronthaul, and it is necessary to confirm whether or not the IQ packet is normal. In the IQ packet, the IQ data is specified for each subcarrier. Therefore, in order to confirm whether the IQ packet is normal or abnormal, it is necessary to confirm not only the total IQ power level of all the subcarriers in the IQ packet, but also the IQ power level per one subcarrier in the IQ packet, so that the cause of a defect (bug) can be identified quickly and reliably. By this, it is possible to efficiently debug the DUT when conducting a performance test such as O-RAN standard conformance test.

Further, the measurement method of the present invention is a measurement method that measures performance of an O-RU that constitutes a base station of an Open RAN (Open Radio Access Network) that performs orthogonal frequency division multiplexing radio communication, the measurement method including: a generating step that generates an RF signal for an uplink test to be transmitted to the O-RU; a measurement step that measures the power of the RF signal generated in the generating step; a receiving step that emulates an O-DU of the base station and receives the IQ packet through a fronthaul from the O-RU that generated the IQ packet based on the RF signal; a calculation step that calculates the total IQ power level of all subcarriers in the IQ packet based on the information of the IQ packet received in the receiving step, and calculates the IQ power level per one subcarrier in the IQ packet based on the total IQ power level; and a display step that displays the IQ power level per one subcarrier calculated in the calculation step on a display unit.

As described above, the measurement method according to the present invention calculates the IQ power level of all subcarriers in the IQ packet based on the information in the IQ packet received by the emulated O-DU from the O-RU in the calculation step in the UL test, and calculates the IQ power level per one subcarrier in the IQ packet based on the total IQ power level, and in the display step, and displays the calculated value of the IQ power level per one subcarrier on the display unit. In the UL test, in the case that the measurement value of the power of the RF signal transmitted to the O-RU, which is measured in the measurement step is not equal to the estimated value of the power level of the RF signal received by the O-RU, which is calculated in the calculation step, it is necessary to investigate the cause. At that time, it is necessary to determine whether the cause of the defect (bug) is on the O-RU (DUT) side or on the emulated O-DU side. The emulated O-DU receives the data for UL test by the IQ packet from the O-RU, which is the DUT, through the fronthaul, and it is necessary to confirm whether or not the IQ packet is normal. In the IQ packet, the IQ data is specified for each subcarrier. Therefore, in order to confirm whether the IQ packet is normal or abnormal, it is necessary to confirm not only the total IQ power level of all subcarriers in the IQ packet, but also the IQ power level per one subcarrier in the IQ packet, so that the cause of a defect (bug) can be identified quickly and reliably. By this, it is possible to efficiently debug the DUT when conducting performance tests such as O-RAN standard conformance tests.

Effect of the Invention

According to the present invention, it is possible to provide a measurement device and a measurement method capable of efficiently debugging a DUT when conducting a performance test such as an O-RAN standard conformance test.

DETAILED DESCRIPTION OF THE INVENTION

Hereinafter, the measurement device and the measurement method according to the embodiments of the present invention will be described in detail with reference to the drawings.

(Device Configuration)

Figure 1:
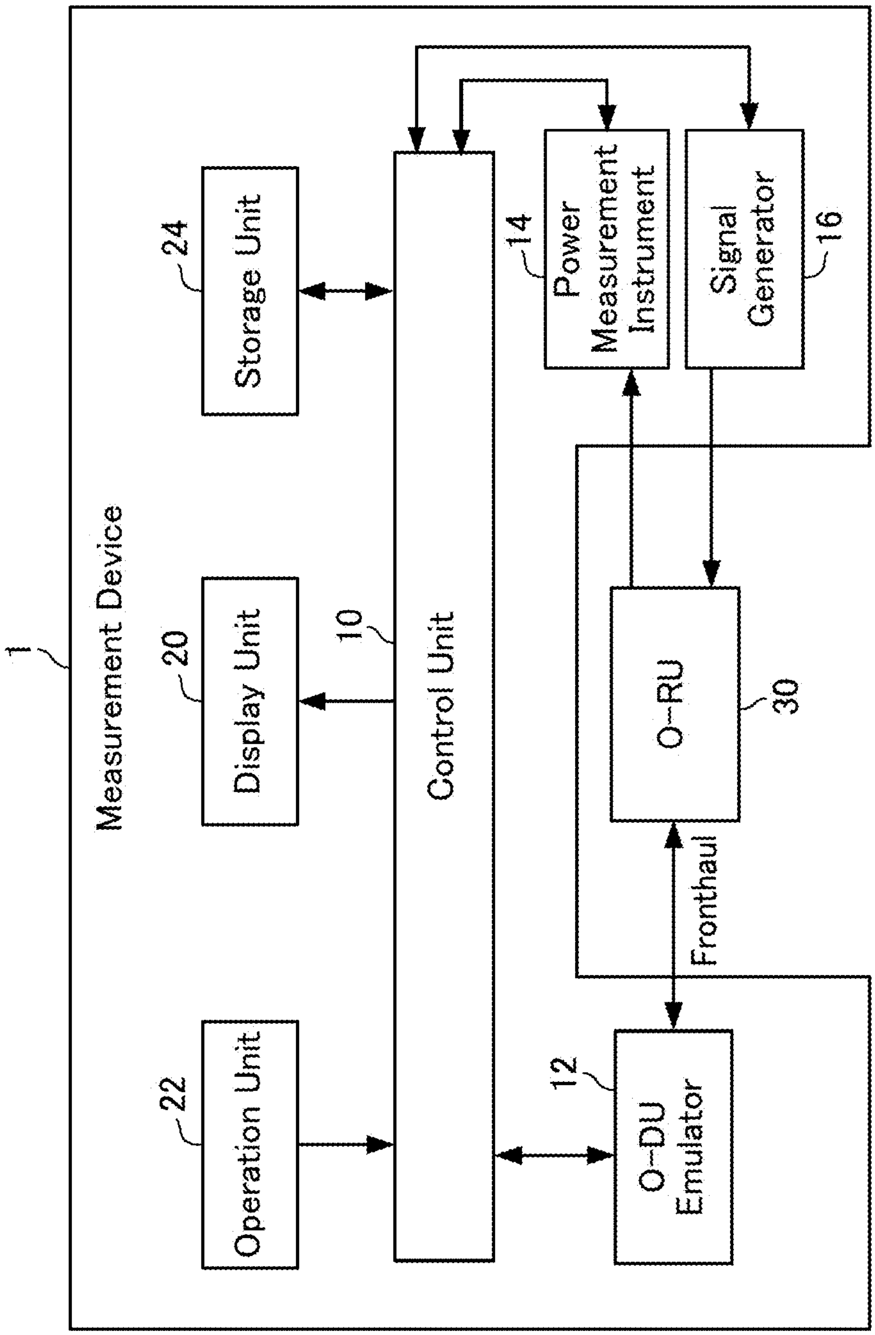
FIG. 1 is a block diagram showing a schematic configuration of a measurement device according to an embodiment of the present invention.

FIG. 1 is a block diagram showing a schematic configuration of a measurement device 1 according to an embodiment of the present invention. The measurement device 1 is configured to measure the performance of an O-RU 30 that constitutes an O-RAN base station that performs orthogonal frequency division multiplexing radio communication. The measurement device 1 can conduct a performance test such as O-RAN standard conformance test, for example. It should be noted that the O-RAN referred to in the specification is considered to be Open RAN in a broad sense, and can be any open specification of a base station in order to separate the RAN into components for each certain function and make them available in combination. It should be noted that a device marked with "O-" is a device that complies with the O-RAN standard.

As shown in FIG. 1, the measurement device 1 includes a control unit 10, an O-DU Emulator 12, a power measurement instrument which measures the power per one subcarrier and the total power of all the subcarriers (SA: Signal Analyzer) 14, a signal generator (SG: Signal Generator) 16, a display unit 20, an operation unit 22, and a storage unit 24. Each component will be described below.

The control unit 10, which is connected to the O-DU Emulator 12, the power measurement instrument 14 that measures the power per one subcarrier and the total power of all the subcarriers, the signal generator 16, the display unit 20, the operation unit 22, and the storage unit 24, controls these devices and executes various processes to conduct a performance test of the O-RU 30, which is a DUT.

The O-DU Emulator 12 emulates the O-DU of the base station and transmits or receives the IQ packets for test to and from the O-RU 30 through the U plane of the pseudo fronthaul. The IQ packet is a packet that includes the IQ data for each subcarrier, and the IQ data is baseband data of an I-phase component (in-phase component) and a Q-phase component (orthogonal phase component).

The power measurement instrument 14 that measures the power per one subcarrier and the total power of all the subcarriers is configured to perform signal analysis such as power measurement of the RF signal transmitted or received by the O-RU 30 under the control of the control unit 10, and send the analysis results to the control unit 10. The power measurement instrument 14 that measures the power per one subcarrier and the total power of all the subcarriers may be, for example, a signal analyzer or a spectrum analyzer.

The signal generator 16 is configured to generate the RF signal for the UL test to be transmitted to the O-RU 30 under the control of the control unit 10.

The display unit 20 includes a display device such as a liquid crystal display, and is configured to display information related to the test, such as setting parameters, estimated value and measurement value of signal power, performance test execution results, and various conditions during the test.

The operation unit 22 includes input device such as a keyboard, a mouse, and a touch panel, and outputs to the control unit 10, for example, instruction information to the measurement device 1 inputted by the user. For example, the user can operate the operation unit 22 to set or select the type of test to be conducted, setting parameters, and the like.

The storage unit 24 is constituted by an HDD (Hard Disk Drive), an SSD (Solid State Drive), a flash memory, and the like, and is configured to store test-related setting parameters, debug information, measurement values, test result information and the like.

A part of or all of the measurement device 1 may be constituted by one or more computer devices having a CPU (Central Processing Unit), a ROM (Read Only Memory), a RAM (Random Access Memory), an auxiliary storage device, a communication interface, and the like.

A program for causing the computer device to function as the measurement device 1 is stored in the ROM and an auxiliary storage device of the computer device constituting the measurement device 1. This means that the computer device functions as the measurement device 1 by the CPU executing a program stored in the ROM and the like using the RAM as a work area.

A part or all of the measurement device 1 may be realized using an integrated circuit such as an ASIC (Application Specific Integrated Circuit) or an FPGA (Field Programmable Gate Array). A part of or all of the measurement device 1 may be realized by a combination of software and hardware circuits.

(Downlink)

Next, the operation of the measurement device 1 during the DL test will be described.

Figure 2:
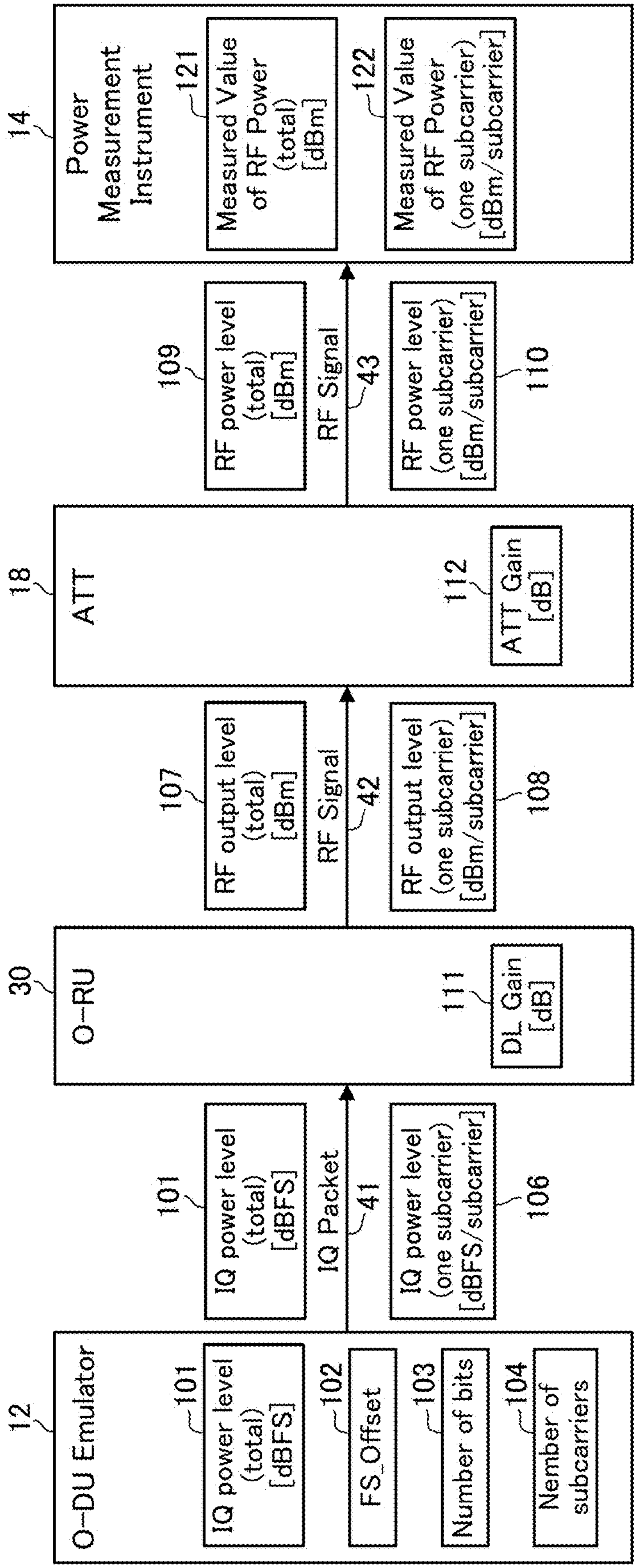
FIG. 2 is a diagram showing information (setting parameters, debug information, measured quantities, and the like) related to the flow of test signals and signal power in a DL test.

FIG. 2 is a diagram showing information (setting parameters, debug information, measured quantities, and the like) related to the flow of test signals and signal power in the DL test. FIG. 2 shows a constitution in which an ATT (Attenuator) 18 is provided between the O-RU 30 and the power measurement instrument 14 that measures the power per one subcarrier and the total power of all the subcarriers. The ATT 18 may be omitted as necessary, or a plurality of ATTs may be used in series.

First, the control unit 10 prepares or obtains the transmitted data and setting parameters for the DL test, and stores them in the storage unit 24. Setting parameters include, for example, IQ power level (total) [dBFS] 101, an FS_Offset 102, a number of bits 103, and a number of subcarriers 104. These setting parameters are sent from the control unit 10 to the O-DU Emulator 12 and are set (stored).

IQ power level (total) [dBFS] 101 is a logarithmic representation of the total power level of the IQ data sent through the fronthaul interface, and in detail, it indicates the total IQ power level of all the subcarriers in the IQ packet in dBFS units.

FS_Offset [dBFS] 102 is an M plane parameter, and is set to 0 if it is not supported by the O-RU or set by the O-DU. The number of bits 103 indicates the number of bits (mantissa portion (amp) and exponent portion (exp)) of the IQ data, and the number of subcarriers 104 indicates the number of OFDM subcarriers.

Furthermore, setting parameters include DL Gain [dB] 111 and ATT Gain [dB] 112. DL Gain [dB] 111 indicates the amplification ratio of the O-RU 30 in the DL test, and ATT Gain [dB] 112 indicates the amplification ratio of the ATT 18 in the DL test. DL Gain [dB] 111 is set in the O-RU 30 from the control unit 10 through the O-DU Emulator 12 by the M plane. DL Gain [dB] 111 may be set directly from the control unit 10 to the O-RU 30.

The O-DU Emulator 12 emulates the O-DU of the base station, and generates the IQ packet including the IQ data for each subcarrier based on the transmitted data for the DL test transmitted from the control unit 10, and transmits the IQ packet to the O-RU 30 through the U plane of the pseudo fronthaul.

The relation between the IQ packet and the IQ power level (total) 101 will be described. In the O-RAN, the IQ data is sent and received as a packet flowing on the U plane between the O-DU and the O-RU. The IQ packet has a structure similar to the header and body part of a TCP packet, and stores parameters for determining scaling of the IQ data, the actual IQ data, and the like. In packet communication between the O-DU and the O-RU, for example, a plurality of the IQ data are sent and received per packet. To be specific, the IQ data is sent and received as an amplitude value for each subcarrier for each in-phase component and orthogonal phase component. Power can be derived from this amplitude value information.

The calculation method for IQ power level [dBFS] is specified in the O-RAN standard, for example, as described in O-RAN.WG4.CUS.0-R003 "8.1.3.1 Definition of IQ power in dBFS".

In detail, the IQ power level [dBFS] of the IQ data is defined by the following formula.

$$IQ\text{ Power Level [dB}FS] = 10*\log_{10}(I\text{^}2+Q\text{^}2) - 10*\log_{10}(FS) = 10*\log_{10}(I\text{^}2+Q\text{^}2) - 10\log_{10}(FS0*2\text{^}(-\text{FS\_Offset})) \quad (1)$$

where, I: in-phase component, Q: orthogonal phase component, FS: full-scale (maximum) allowable value of I or Q, FS_Offset: M plane parameter, FS0=max (I^2)=max (Q^2) =max (I^2+Q^2)

The control unit 10 calculates the IQ power level (IQ power level (subcarrier) [dBFS/subcarrier]) 106 per one subcarrier in the IQ packet based on the set value of the total IQ power level (IQ power level (total) [dBFS]) 101 of all subcarriers in the IQ packet. The display unit 20 displays the IQ power level (IQ power level (subcarrier) [dBFS/subcarrier]) 106 per one subcarrier calculated by the control unit 10 (see FIG. 4).

For example, when IQ power level (total) [dBFS]=−10 [dBFS] and the number of subcarriers=3276, the result is IQ power level (subcarrier) [dBFS/subcarrier]=IQ power level [dBFS]+10*$\log_{10}$ (1/number of subcarriers)=−45.15 [dBFS/subcarrier].

The O-RU 30 receives the IQ packet 41 sent from the O-DU Emulator 12, generates the RF signal 42 based on the IQ packet 41 and DL gain (DL Gain [dB]) 111, and outputs it.

The control unit 10 calculates the sum of the total IQ power level (IQ power level (total) [dBFS]) 101 of all the subcarriers in the IQ packet 41 and the DL gain (DL Gain [dB]) 111 set in the O-RU 30, as the total RF power level (RF output level (total) [dBm]) 107 of all the subcarriers of the RF signal 42 transmitted from the O-RU 30. The display unit 20 displays the total RF power level (RF output level (total) [dBm]) 107 of all the subcarriers of the RF signal 42 calculated by the control unit 10 (see FIG. 4).

Further, the control unit 10 calculates the sum of the IQ power level (IQ power level (subcarrier) [dBFS/subcarrier]) 106 per one subcarrier in the IQ packet 41 and the DL gain (DL Gain [dB]) set in the O-RU 30 111, as the RF power level (RF output level (subcarrier) [dBm/subcarrier]) 108 per one subcarrier of the RF signal 42 transmitted from the O-RU 30. The display unit 20 displays the RF power level (RF output level (subcarrier) [dBm/subcarrier]) 108 per one subcarrier of the RF signal 42 calculated by the control unit 10 (see FIG. 4).

In detail, the RF output level [dBm] is calculated by the following formula.

$$RF\text{ output level [dBm]}=IQ\text{ power level [dBFS]}+DL\text{ Gain [dB]}$$

For example, when the IQ power level (total)=−15.01 [dBFS] and DL Gain=32 [dB], the result is RF output level (total)=16.99 [dBm]. Further, when the IQ power level (subcarrier)=−50.16 [dBFS/subcarrier] and the DL Gain=32 [dB], the result is the RF output level (subcarrier)=−18.16 [dBm/subcarrier].

The ATT 18 receives the RF signal 42 sent from the O-RU 30, attenuates the RF signal 42 based on the ATT gain (ATT Gain [dB]) 112, and outputs it as the RF signal 43.

The control unit 10 calculates the sum of the total RF power level (RF output level (total) [dBm]) 107 of all the subcarriers of the RF signal 42 transmitted from the O-RU 30 and the ATT gain (ATT Gain [dB]) 112, as the total RF power level (RF output level (total) [dBm]) 109 of all the subcarriers of the RF signal 43 transmitted from the ATT 18.

The display unit 20 may display the total RF power level (RF output level (total) [dBm]) 109 of all the subcarriers of the RF signal 43 calculated by the control unit 10.

Further, the control unit 10 calculates the sum of the RF power level (RF output level (subcarrier) [dBm/subcarrier]) 108 per one subcarrier of the RF signal 42 transmitted from the O-RU 30 and the ATT gain (ATT Gain [dB]) 112, as the RF power level (RF output level (subcarrier) [dBm/subcarrier]) 110 per one subcarrier of the RF signal 43 transmitted from ATT 18. The display 20 may display the RF power level (RF output level (subcarrier) [dBm/subcarrier]) 110 per one subcarrier of the RF signal 43 calculated by the control unit 10.

In detail, the RF output level [dBm] is calculated by the following formula.

$$RF \text{ output level [dBm]} = IQ \text{ power level [dBFS]} + DL \text{ Gain [dB]} - ATT \text{ Gain [dB]}$$

For example, when IQ power level (total)=−15.01 [dBFS], DL Gain=32 [dB], and ATT Gain=40 [dB], the result is RF output level (total)=−23.01 [dBm]. Further, when IQ input level (subcarrier)=−50.16 [dBFS/subcarrier], DL Gain=32 [dB], and ATT Gain=40 [dB], the result is RF output level (subcarrier)=−58.16 [dBm/subcarrier].

The power measurement instrument 14 that measures the power per one subcarrier and the total power of all the subcarriers measures the total power of all the subcarriers of the RF signal 43 transmitted from the ATT 18 under the control of the control unit 10, obtains the RF power measurement value (total) [dBm] 121, and sends the information of the measurement value to the control unit 10. Further, the power measurement instrument 14 that measures the power per one subcarrier and the total power of all the subcarriers measures the power per one subcarrier of the RF signal 43 transmitted from the ATT 18, obtains the RF power measurement value (subcarrier) [dBm/subcarrier] 122 and sends the information of measurement value to the control unit 10. The display unit 20 displays the measurement value (RF power measurement value (total) [dBm]) 121 of the total power of all subcarriers of the RF signal 43 transmitted from the ATT18, which is measured by the power measurement instrument 14 that measures the power per one subcarrier and the total power of all subcarriers, and the measurement value (RF power measurement (subcarrier) [dBm/subcarrier]) 122 of the power per one subcarrier of the RF signal 43 measured by the power measurement instrument 14 that measures the power per one subcarrier and the total power of all subcarriers (see FIG. 4).

Figure 4:
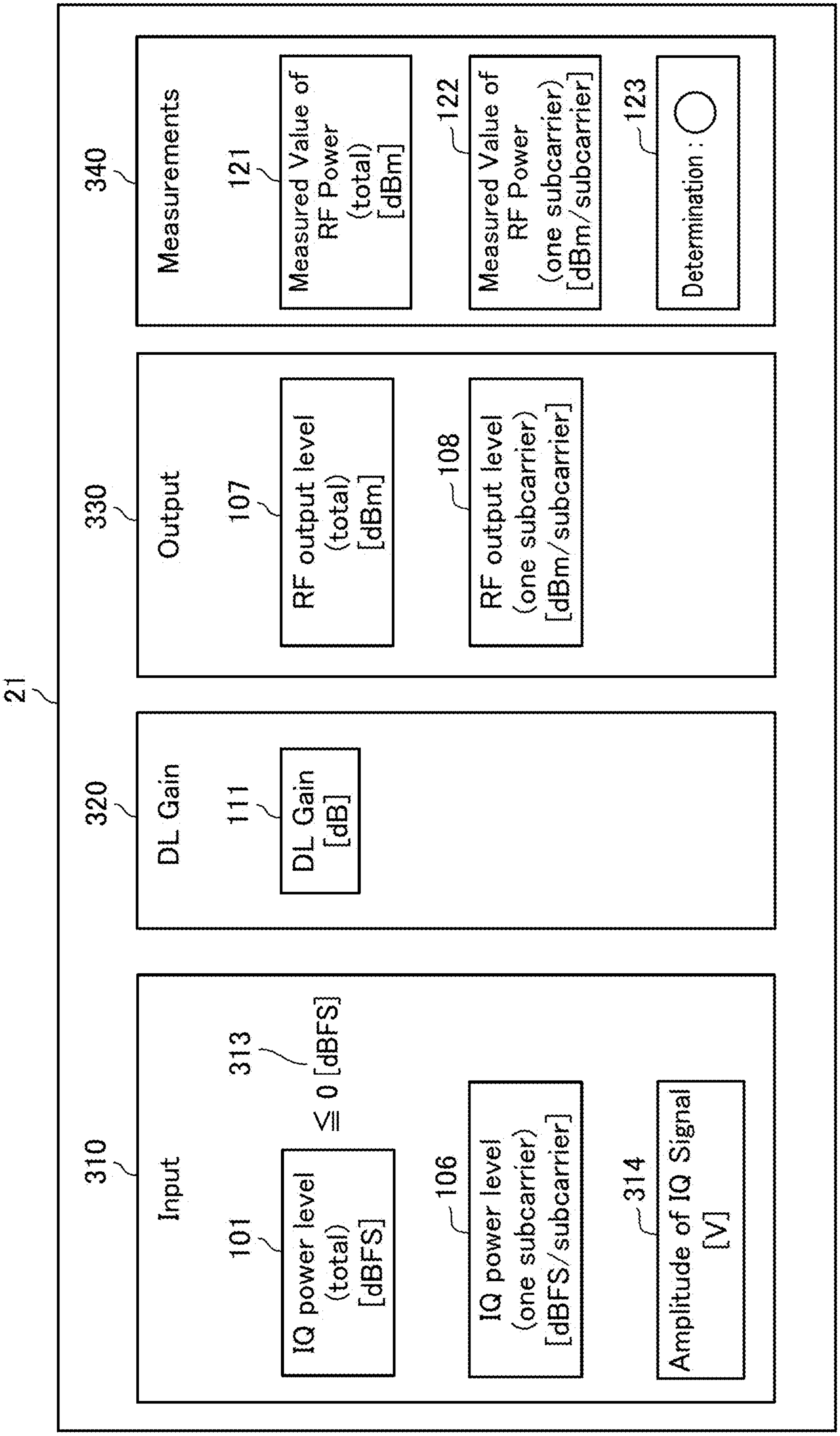
FIG. 4 is a diagram showing an example of a display screen of a display unit in a DL test.

Further, the control unit 10 may obtain the value 313 set as the upper limit based on the standard for the total IQ power level of all the subcarriers in the IQ packet, and the display unit 20 may display the value 313 set as the upper limit based on the standard together with the total IQ power level (IQ power level (total) [dBFS]) 101 (see FIG. 4).

Further, the control unit 10 calculates the amplitude of the IQ signal included in the IQ packet. The display unit 20 displays the amplitude [V] 314 of the IQ signal calculated by the control unit 10 (see FIG. 4).

To be specific, the following formula is established from formula (1).

$$I\text{^}2 + Q\text{^}2 = 10\text{^}[\{IQ \text{ power level(total)} + 10 * \log_{10}(FS)\}/10]$$

For example, when the IQ power level (total) [dBFS]=−10 [dBFS], FS Offset=0 [dB], number of bits (mantissa part (amp))=14 [bit], number of bits (exponent part (exp))=4 [bit], and number of subcarriers=3276, the result is I^2+Q^2=7.21E+15 [watt]. I^2+Q^2 per subcarrier is (I^2+Q^2)*10^($\log_{10}$ (1/(number of subcarriers)))=2.20E+12 [watt]. Here, RMS=sqrt (I^2+Q^2)=1483091.45 [volt]. Therefore, in the case of QPSK, I (or Q) level (that is, the amplitude of the IQ signal) is 1/√2*RMS=1048704.02 [volt].

(Uplink)

Next, the operation of the measurement device 1 during the UL test will be described.

Figure 3:
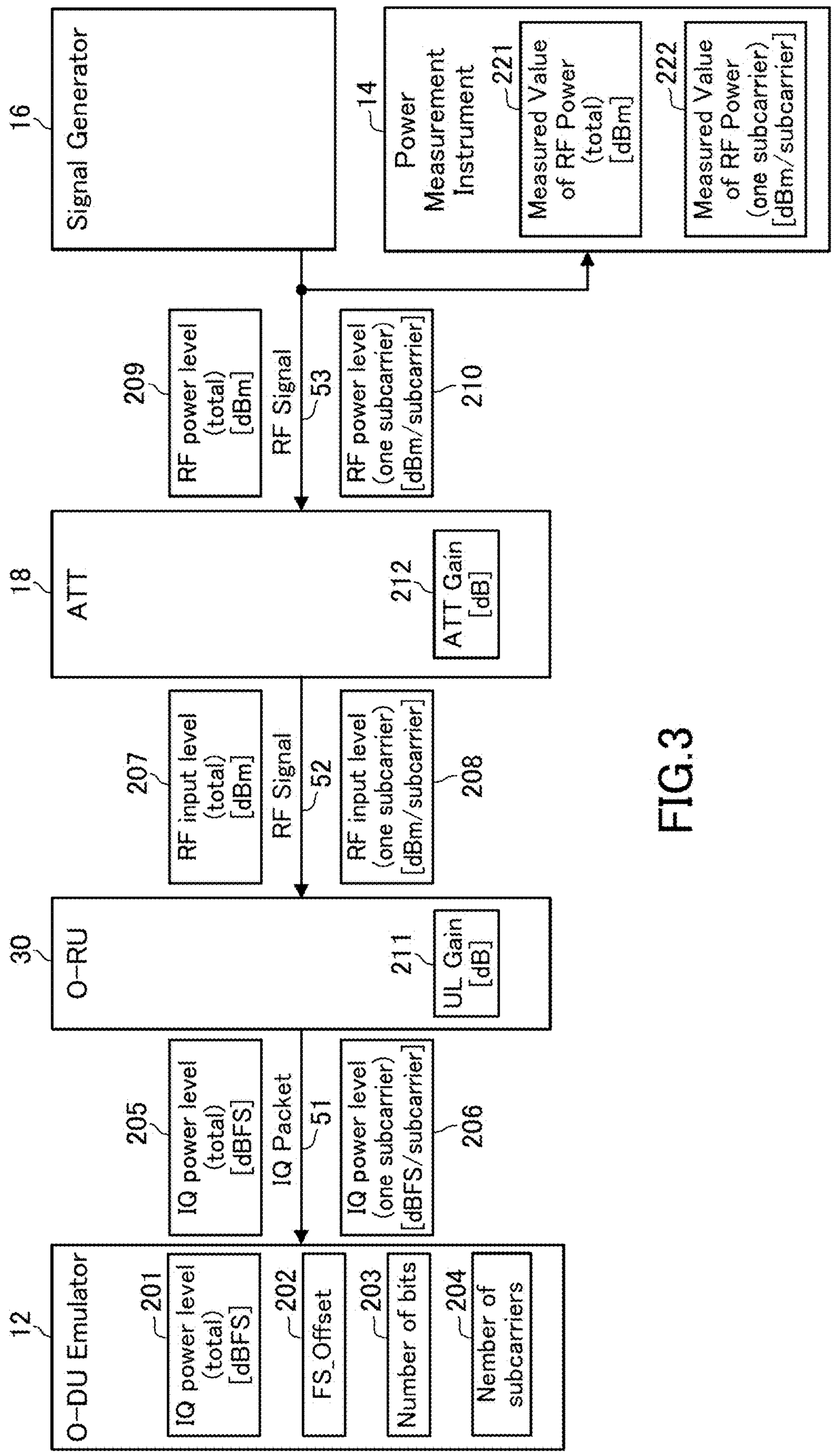
FIG. 3 is a diagram showing information (setting parameters, debug information, measured quantities, and the like) related to signal flow and signal power in a UL test.

FIG. 3 is a diagram showing information (setting parameters, debug information, measured quantities, and the like) related to the test signal flow and signal power in the UL test. FIG. 3 shows a constitution in which the ATT 18 is provided between the signal generator 16 and the O-RU 30.

First, the control unit 10 prepares or obtains the transmitted data and setting parameters for the UL test, and stores them in the storage unit 24. Setting parameters include, for example, IQ power level (total) [dBFS] 201, FS_Offset 202, number of bits 203, and number of subcarriers 204. These setting parameters indicate similar information as the corresponding setting parameters of the DL test. The setting parameters are sent from the control unit 10 to the O-DU Emulator 12 and set (stored).

Further, setting parameters include UL Gain [dB] 211 and ATT Gain [dB] 212. UL Gain [dB] 211 indicates the amplification ratio of the O-RU 30 in the UL test, and ATT Gain [dB] 212 indicates the amplification ratio of the ATT 18 in the UL test. UL Gain [dB] 211 is set in the O-RU 30 by the M plane from the control unit 10 through the O-DU Emulator 12. The UL Gain [dB] 211 may be set directly from the control unit 10 to the O-RU 30.

The signal generator 16 generates the RF signal 53 based on the transmitted data for UL test sent from the control unit 10, and transmits it to the O-RU 30 through the ATT 18.

A power measurement instrument 14 that measures the power per one subcarrier and the total power of all the subcarriers measures the total power of all the subcarriers of the RF signal 53 generated by the signal generator 16, obtains the RF power measurement value (total) [dBm] 221, and sends it to the control unit 10. Further, the power measurement instrument 14 that measures the power per one subcarrier and the total power of all the subcarriers measures the power per one subcarrier of the RF signal 53 generated by the signal generator 16, obtains the RF power measurement value (subcarrier) [dBm/subcarrier] 222 and sends it to the control unit 10. The display unit 20 displays the RF power measurement value (total) [dBm] 221 and RF power measurement value (subcarrier) [dBm/subcarrier] 222 (see FIG. 5).

The ATT 18 receives the RF signal 53 sent from the signal generator 16, attenuates the RF signal 53 based on the ATT Gain [dB] 212, and outputs it as the RF signal 52.

The O-RU 30 receives the RF signal 52 transmitted from the ATT 18, generates the IQ packet 51 including the IQ data for each subcarrier based on the RF signal 52 and UL Gain [dB] 211, and sends the IQ packet 51 to the O-DU Emulator 12 through the U plane of the fronthaul.

The O-DU Emulator 12 emulates the O-DU of the base station and receives the IQ packet 51 for the UL test from the O-RU 30 through the U plane of the pseudo fronthaul.

The control unit 10 calculates the total IQ power level (IQ power level (total) [dBFS]) 205 of all the subcarriers in the IQ packet based on the information of the IQ packet 51 received by the O-DU Emulator 12, and calculates the IQ power level (IQ power level (subcarrier) [dBFS/subcarrier]) 206 per one subcarrier in the IQ packet based on the total IQ power level. The display unit 20 distinguishes and displays the IQ power level (IQ power level (subcarrier) [dBFS/subcarrier]) 206 per one subcarrier and the total IQ power level (IQ power level (total) [dBFS]) 205 calculated by the control unit 10.

In detail, according to the O-RAN standard, Configured_UL gain can be determined by the following formula.

$$\text{Configured\_UL\_gain [in dB]} = \text{Interface resolution } [\text{dB}FS] - (-152\ \text{dBm}) + \text{gain\_correction [dB]}$$

given that gain_correction=0 [dB], $$\text{Interface resolution}[\text{dB}FS] = -20 * \log_{10}(2\hat{}(\text{amp}-1) * 2\hat{}(2\hat{}\text{exp}-1)) = -138.47\ [\text{dB}FS]$$

Therefore, IQ power level after correction [dBFS]=IQ power level (before correction)+Configured_UL_gain=−67.18 [dBFS]

Further, the control unit 10 calculates the difference obtained by subtracting the UL gain (UL Gain [dB]) 211 set in the O-RU 30 from the total IQ power level (IQ power level (total) [dBFS]) 205 of all the subcarriers in the IQ packet, as an estimated value of the total RF power level (RF input level (total) [dBm]) 207 of all the subcarriers of the RF signal 52 received by the O-RU 30.

Further, the control unit 10 calculates the difference by subtracting the UL gain (UL Gain [dB]) 211 set in the O-RU 30 from the IQ power level IQ power level (subcarrier) [dBFS/subcarrier]) 206 per one subcarrier in the IQ packet, as an estimated value of the RF power level (RF input level (subcarrier) [dBm/subcarrier]) 208 per one subcarrier of the RF signal received by the O-RU 30.

The display unit 20 displays the estimated value of the total RF power level (RF input level (total) [dBm]) 207 of all the subcarriers of the RF signal 52 received by the O-RU 30, calculated by the control unit 10, and the estimated value of the RF power level (RF input level (subcarrier) [dBm/subcarrier]) 208 per one subcarrier of the RF signal 52 received by the O-RU 30.

In detail, the RF input level [dBm] is calculated using the following formula.

$$RF \text{ input level} = IQ \text{ power level [dBFS]} - UL \text{ Gain [dB]}$$

For example, when IQ power level (total)=−39.31 [dBFS] and UL Gain=0 [dB], the result is RF input level (total)=−39.31 [dBm]. Furthermore, when IQ power level (subcarrier)=−67.18 [dBFS/subcarrier] and UL Gain=0 [dB], the result is RF input level (subcarrier)=−67.18 [dBm/subcarrier].

The control unit 10 calculates the difference obtained by subtracting the ATT Gain [dB] 212 from the total RF power level (RF input level (total) [dBm]) 207 of all the subcarriers of the RF signal 52 transmitted from the ATT 18 to the O-RU 30, as an estimated value of the total RF power level (RF power level (total) [dBm]) 209 of all the subcarriers of the RF signal 53 received by the ATT 18.

Further, the control unit 10 calculates the difference obtained by subtracting the ATT Gain [dB] 212 from the RF power level (RF input level (subcarrier) [dBm/subcarrier]) 208 per one subcarrier of the RF signal 52 transmitted from the ATT 18 to the O-RU 30, as an estimated value of the RF power level (RF input level (subcarrier) [dBm/subcarrier]) 210 per one subcarrier of the RF signal 53 received by the ATT18.

The display unit 20 may display the estimated value of the total RF power level (RF power level (total) [dBm]) 209 and the estimated value of the RF power level (RF power level (subcarrier) [dBm/subcarrier]) 210 per one subcarrier.

In detail, the RF power level [dBm] is calculated using the following formula.

$$RF \text{ power level} = RF \text{ input level [dBm]} + ATT \text{ Gain [dB]}$$

For example, when RF input level (total) [dBm]=−37.18 [dBm], ATT Gain=0 [dB], the result is RF power level (total)=−37.18 [dBm]. Further, when RF input level (subcarrier) [dBm/subcarrier]=−65.05 [dBm/subcarrier], ATT Gain=0 [dB], the result is RF power level (subcarrier) per one subcarrier=−65.05 [dBm/subcarrier].

The control unit 10 determines whether or not the total RF power measurement value (total) [dBm] 221 is equal to the estimated value of the total RF power level (RF power level (total) [dBm]) 209 of all the subcarriers of the RF signal 53 transmitted to the ATT 18. Further, the control unit 10 determines whether or not the RF power measurement value (subcarrier) [dBm] 222 per one subcarrier is equal to the estimated value of the RF power level (RF power level (subcarrier) [dBm/subcarrier]) 210 per one subcarrier of the RF signal 53 transmitted to the ATT 18. In the determination, if the difference between the two is within a predetermined range of the estimated value (for example, within ±5%), it may be determined that the two are equal. The display unit 20 displays the determination result 223.

Figure 5:
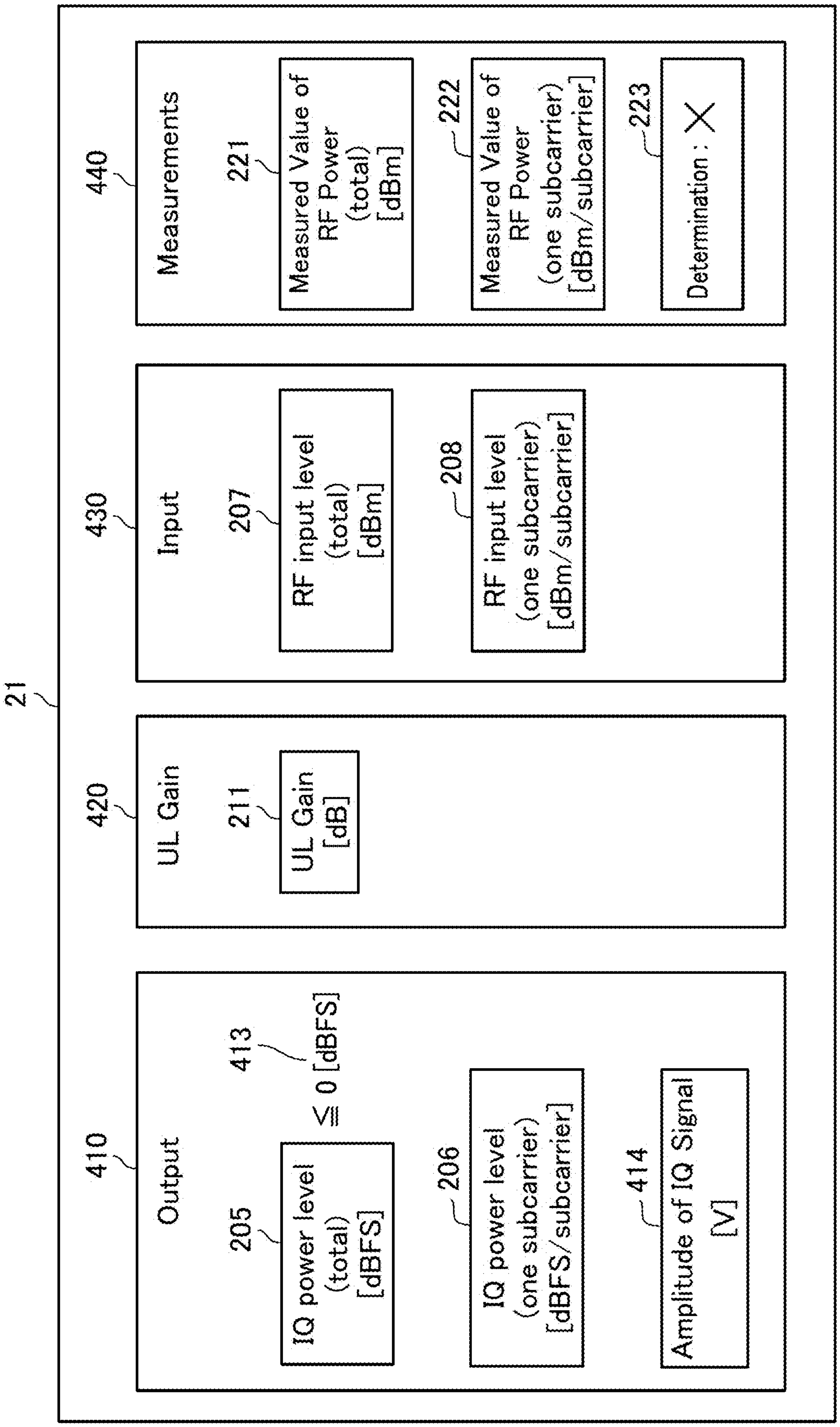
FIG. 5 is a diagram showing an example of a display screen of a display unit in a UL test.

Further, the control unit 10 may obtain a value set as an upper limit based on the standard for the total IQ power level of all the subcarriers in the IQ packet, and the display unit 20 may display the value set as the upper limit based on the standard together with the total IQ power level 205 (see reference numeral 413 in FIG. 5).

Further, the control unit 10 calculates the amplitude of the IQ signal included in the IQ packet. The display unit 20 displays the amplitude 414 of the IQ signal calculated by the control unit 10 (see FIG. 5).

For example, when I^2+Q^2=303592250 [watt], RMS=sqrt (I^2+Q^2)=17423.90 [volt]. In the case of QPSK, I (or Q) level (that is, the amplitude of the IQ signal) is 1/2*RMS=12320.56 [volt].

(Display Screen)

Next, the display screen 21 of the display unit 20 will be described.

The display unit 20 displays the IQ power level per one subcarrier in the IQ packet, the total IQ power level of the all the subcarriers, the value set as the upper limit based on the standard, the gain set to the O-RU30, and the measurement value of the power of the RF signal obtained by the power measurement instrument 14 that measures the power per one subcarrier and the total power of all the subcarriers, collectively for each group related to input and output to the O-RU 30 and measurement. To be specific, the details are as shown below.

<DL Test>

FIG. 4 is a diagram showing an example of the display screen 21 of the display unit 20 in the DL test. As shown in FIG. 4, the display screen 21 includes, for example, an input display area 310, a gain display area 320, an output display area 330, and a measurement value display area 340.

The input display area 310 is an area that displays information related to input to the O-RU 30, which is a DUT, and for example, the total IQ power level (IQ power level (total) [dBFS]) 101 of all the subcarriers in an IQ packet, IQ power level (IQ power level (subcarrier) [dBFS/subcarrier]) 106 per one subcarrier, and amplitude 314 of the IQ signal are displayed. The input display area 310 may display FS_Offset [dBFS] 102, the number of bits 103, the number of subcarriers 104, and the like. Further, in the input display area 310, a value (for example, ≤0 [dBFS]) 313 set as an upper limit based on the standard is displayed for the total IQ power level (IQ power level (total) [dBFS]) 101. When no upper limit is set, the value may or may not be displayed.

In the gain display area 320, the DL gain (DL Gain [dB]) 111 in the O-RU 30 is displayed. When the ATT 18 is used, the DL gain (ATT Gain [dB]) 112 of the ATT 18 may be displayed together or in addition.

The output display area 330 is an area that displays information related to the output from the O-RU 30, and for example, the estimated value of the total RF power level (RF output level (total) [dBm]) 107 of all the subcarriers and the estimated value of the RF power level (RF output level (subcarrier) [dBm/subcarrier]) 108 per one subcarrier are displayed for the RF signal 42 outputted from the O-RU 30. When the ATT 18 is used, the estimated value of the total RF power level (RF power level (total) [dBm]) 109 of all the subcarriers of the RF signal 43 and the estimated value of the RF power level (RF power level (subcarrier) [dBm/subcarrier]) 110 per one subcarrier may be displayed.

The measurement value display area 340 is an area that displays measurement values obtained by the power measurement instrument 14 that measures the power per one subcarrier and the total power of all the subcarriers, and for example, the total power measurement value of all the subcarriers (RF power measurement value [dBm]) 121 and the power measurement value (RF power measurement value [dBm/subcarrier]) 122 per one subcarrier are displayed for the RF signal 42 or 43 outputted from the O-RU 30 or the ATT 18.

<UL Test>

FIG. 5 is a diagram showing an example of the display screen 21 of the display unit 20 in the UL test. As shown in FIG. 5, the display screen 21 includes, for example, an output display area 410, a gain display area 420, an input display area 430, and a measurement value display area 440.

The output display area 410 is an area for displaying information related to the output from the O-RU 30, which is a DUT, for example the total IQ power level (IQ power level (total) [dBFS]) 205 of all the subcarriers in the IQ packet, an IQ power level (IQ power level (subcarrier) [dBFS/subcarrier]) 206 per one subcarrier, and an amplitude 414 of the IQ signal are displayed. The output display area 410 may display FS_Offset [dBFS] 202, the number of bits 203, the number of subcarriers 204, and the like. Further, in the output display area 410, a value (for example, ≤0 [dBFS]) 413 set as an upper limit based on the standard is displayed for the total IQ power level (IQ power level (total) [dBFS]) 205. When no upper limit is set, the value may or may not be displayed.

In the gain display area 420, the UL gain (UL Gain [dB]) 211 in the O-RU 30 is displayed. In the case that the ATT 18 is used, the UL gain (ATT Gain [dB]) 212 of the ATT 18 may be displayed together or in addition.

The input display area 430 is an area that displays information related to the input to the O-RU 30, and for example, the estimated value of the total RF power level (RF input level (total) [dBm]) 207 of all the subcarriers and the estimated value of the RF power level (RF input level (subcarrier) [dBm/subcarrier]) 208 per one subcarrier are displayed for the RF signal 52 inputted to the O-RU 30. In the case that the ATT 18 is used, the estimated value of the total RF power level (RF power level (total) [dBm]) 209 of all the subcarriers of the RF signal 53 and the RF power level (RF power level (subcarrier) [dBm/subcarrier]) 210 per one subcarrier may be displayed.

The measurement value display area 440 is an area that displays measurement values obtained by the power measurement instrument 14 that measures the power per one subcarrier and the total power of all the subcarriers, for example, regarding the input RF signal 52 or 53, the total power measurement value of all the subcarriers (RF power measurement value (total) [dBm]) 221 and the power measurement value (RF power measurement value (subcarrier) [dBm/subcarrier]) 222 per one subcarrier are displayed for the RF signal 52 or 53 inputted to the O-RU 30 or ATT 18.

(Measurement Method)

Next, the measurement method according to an embodiment of the present invention will be described.

<DL Test>

Figure 6:
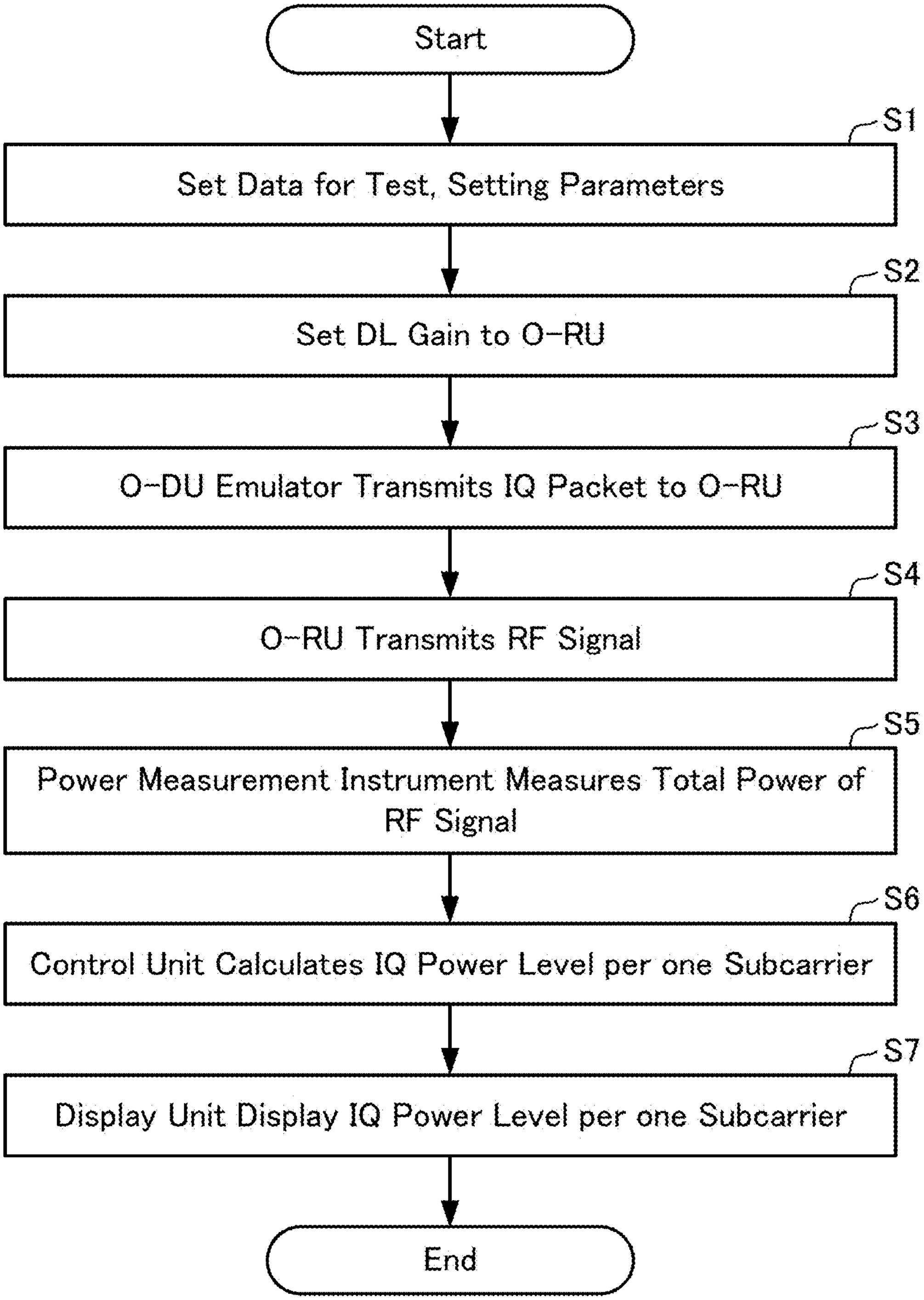
FIG. 6 is a flowchart showing a schematic procedure of a measurement method (DL test) according to an embodiment of the present invention.

FIG. 6 is a flow chart showing a schematic procedure of the measurement method in the DL test. As shown in FIG. 6, first, the control unit 10 prepares (sets) data for the test and setting parameters (Step S1). The data for test and setting parameters may be input by the user through the operation unit 22, or may be used those stored in the storage unit 24 in advance.

Next, the control unit 10 also sets setting parameters necessary for the functions of the O-DU Emulator 12 to the O-DU Emulator 12. Further, the O-DU Emulator 12 emulates the O-DU of the base station under the control of the control unit 10 and sets the DL gain 111 to the O-RU 30 through the M plane of the fronthaul (step S2).

Next, the O-DU Emulator 12 emulates the O-DU of the base station, generates the IQ packet 41 for the DL test based on the data for test, and transmits the generated IQ packet 41 to the O-RU 30 through the U plane of the fronthaul (step S3).

Next, the O-RU 30 receives the IQ packet 41 transmitted from the O-DU Emulator 12, generates the RF signal 42 based on the IQ packet 41 and the DL gain 111, and sends the RF signal 42 wirelessly or by wire to the power measurement instrument 14 that measures the power per one subcarrier and the total power of all the subcarriers, as necessary through the ATT 18 (step S4).

Next, the power measurement instrument 14 that measures the power per one subcarrier and the total power of all the subcarriers measures the total power of all the subcarriers of the RF signal 43 transmitted from the O-RU 30 through the ATT 18 (step S5). Information of the measurement value 121 of the total power of the RF signal 43 is sent to the control unit 10 and stored in the storage unit 24. Further, the power measurement instrument 14 that measures the power per one subcarrier and the total power of all the subcarriers may measure the power per one subcarrier of the RF signal 43, and may send the information of the measurement value 122 to the control unit 10 and store the information of the measurement value 122 in the storage unit 24.

The control unit 10 calculates the IQ power level 106 per one subcarrier in the IQ packet based on a preset set value of the total IQ power level 101 of all the subcarriers in the IQ packet (step S6).

The user can determine the success or failure of the DL test from the viewpoint of power from the measurement value 121 of the total power of all the subcarriers of the RF signal 43. In order to increase debugging efficiency when the DL test fails, the display unit 20 displays the IQ power level 106 per one subcarrier calculated by the control unit 10 (step S7).

Further, the control unit 10 calculates the sum of the total IQ power level 101 of all the subcarriers in the IQ packet 41 and the DL gain 111 set in the O-RU 30 as the estimated value of the total RF power level 107 of all the subcarriers of the RF signal 42 transmitted from the O-RU 30. In the case that the ATT18 is used, the control unit 10 calculates the sum of the total IQ power level 101 of all the subcarriers in the IQ packet 41, the DL gain 111 set in the O-RU 30, and the ATT gain 112, as an estimated value of the total RF power level 109 of all the subcarriers of the RF signal 43 transmitted from the ATT18.

Then, the control unit 10 determines whether or not the measurement value 121 of the power of the RF signal 42 is equal to the estimated value of the total RF power level 107 of all the subcarriers of the RF signal 42 calculated by the control unit 10. In the case that the ATT 18 is used, the control unit 10 determines whether or not the measurement value 121 of the total power of the RF signal 43 is equal to the estimated value of the total RF power level 109 of all the subcarriers of the RF signal 43 calculated by the control unit 10. In the determination, if the difference between the two is within a predetermined range of the estimated value (for example, within ±5%), it may be determined that the two are equal. The display unit 20 displays the determination result 123.

It should be noted that in FIG. 6, step S6 is described next to step S5, but the order is not limited to this, and may be conducted at any stage after step S1 and before step S7.

<UL Test>

Figure 7:
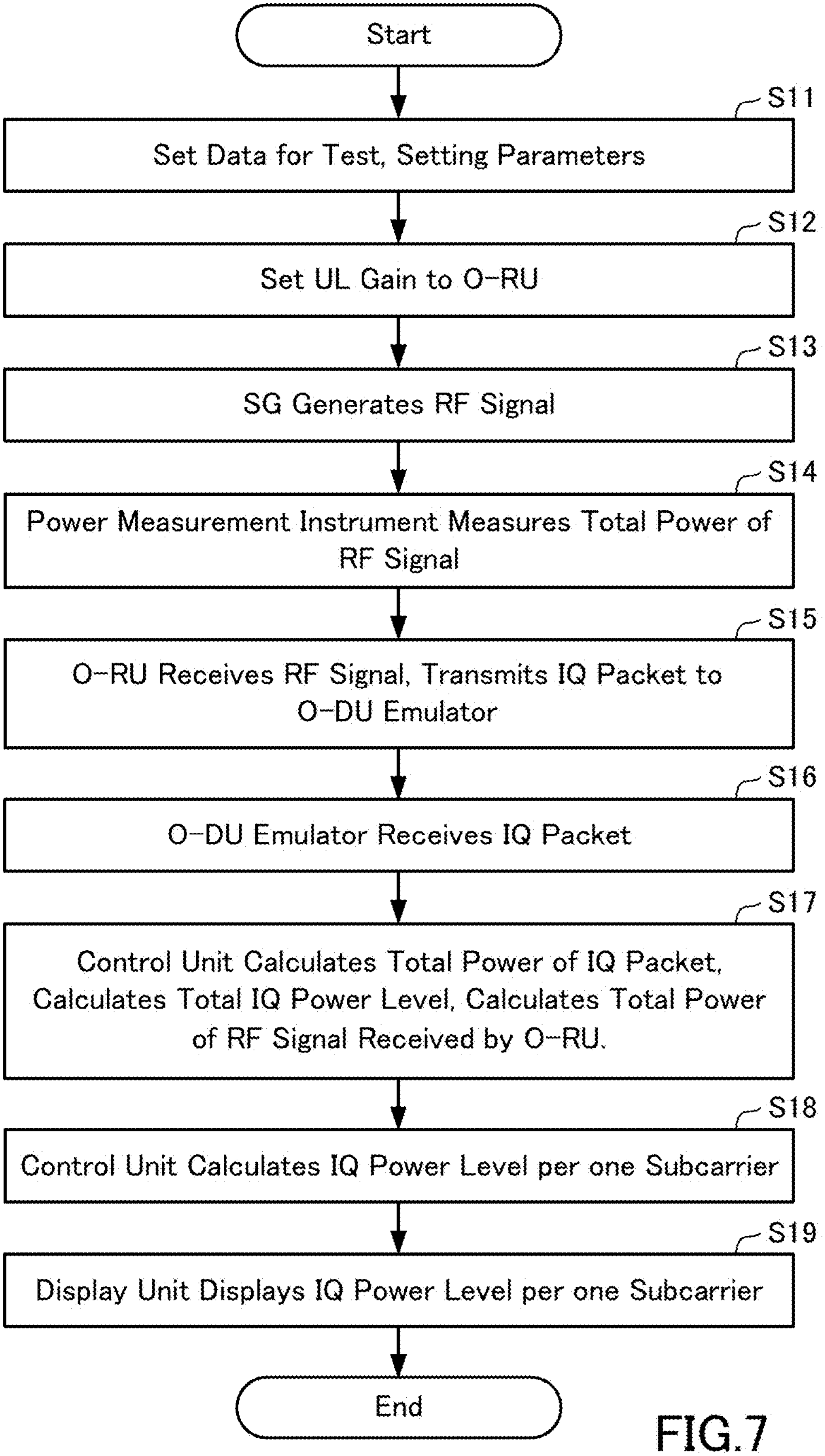
FIG. 7 is a flowchart showing a schematic procedure of a measurement method (UL test) according to an embodiment of the present invention.

FIG. 7 is a flowchart showing the schematic procedure of the measurement method in the UL test. As shown in FIG. 7, first, the control unit 10 prepares (sets) test data and setting parameters (step S11). The data for test and setting parameters may be input by the user through the operation unit 22, or may be used those stored in the storage unit 24 in advance.

Next, the control unit 10 sets setting parameters necessary for the functions of the O-DU Emulator 12 in the O-DU Emulator 12. Further, the O-DU Emulator 12 emulates the O-DU of the base station under the control of the control unit 10 and sets the UL gain 211 in the O-RU 30 through the M plane of the fronthaul (step S12).

Next, the signal generator 16 generates a RF signal 53 for the UL test based on the data for test sent from the control unit 10, and transmits it to the O-RU 30 (step S13).

The power measurement instrument 14, that measures the power per one subcarrier and the total power of all the subcarriers, measures the total power of all the subcarriers of the RF signal 53 generated by the signal generator 16 (step S14). Information of the measurement value 221 of the total power of the RF signal 53 is sent to the control unit 10 and stored in the storage unit 24. Further, the power measurement instrument 14 that measures the power per one subcarrier and the total power of all the subcarriers may measure the power per one subcarrier of the RF signal 53, and may send information of the measurement value 222 to the control unit 10 and store in the storage unit 24.

Next, the O-RU 30 receives the RF signal 52 transmitted from the signal generator 16 through the ATT 18, generates the IQ packet 51 based on the RF signal 52 and the UL gain 211, and transmits the IQ packet 51 to the O-DU Emulator 12 though the U plane of the fronthaul (step S15).

Next, the O-DU Emulator 12 emulates the O-DU of the base station and receives the IQ packet 51 through the U plane of the fronthaul (step S16).

Next, the control unit 10 calculates the total power of all the subcarriers of the IQ data, based on the information of the IQ packet 51 received by the O-DU Emulator 12, and based on the calculated value, the control unit 10 calculates the total IQ power level 205 of all the subcarriers of the IQ packet 51 (step S17). Further, the control unit 10 calculates the IQ power level 206 per one subcarrier in the IQ packet based on the total IQ power level 205 (step S18).

The user can determine the success or failure of the UL test from the viewpoint of power from the total IQ power level 205, the total power measurement value 221 of the RF signal 53, and the like. In order to increase debugging efficiency when the UL test fails, the display unit 20 displays the IQ power level 206 per one subcarrier calculated by the control unit 10 (step S19).

Further, the control unit 10 calculates the difference obtained by subtracting the UL gain 211 set in the O-RU 30 from the total IQ power level 205 of all the subcarriers in the IQ packet 51 as the estimated value of the total RF power level 207 of all the subcarriers of the RF signal 52 received by the O-RU 30. The display unit 20 displays a total power measurement value 221 of the RF signal 52 obtained by the power measurement instrument 14 that measures the power per one subcarrier and the total power of all the subcarriers, together with the estimated value of the total RF power level 207 of all subcarriers of the RF signal 52 calculated by the control unit 10. In the case that the ATT 18 is used, the control unit 10 calculates the difference obtained by subtracting the UL gain 211 set in the O-RU 30 from the total IQ power level 205 of all the subcarriers in the IQ packet 51 and the ATT gain 212 as the estimated value of the total RF power level 209 of all the subcarriers of the RF signal 53 input to the ATT 18.

Then, the control unit 10 determines whether or not the measurement value 221 of the power of the RF signal 52 is equal to the estimated value of the total RF power level 207 of all the subcarriers of the RF signal 52 calculated by the control unit 10. In the case that the ATT 18 is used, the control unit 10 determines whether or not the measurement value 221 of the total power of the RF signal 53 is equal to the estimated value of the total RF power level 209 of all the subcarriers of the RF signal 53 calculated by the control unit 10. In the determination, if the difference between the two is within a predetermined range of the estimated value (for example, within ±5%), it may be determined that the two are equal. The display unit 20 displays the determination result 223.

Effect

As described above, in the measurement device 1 of the present embodiment, in the DL test, the control unit 10 is configured to calculate the IQ power level 106 per one subcarrier in the IQ packet based on the set value of the total IQ power level 101 of all the subcarriers in the IQ packet, and the display unit 20 is configured to display the calculated value of the IQ power level 106 per one subcarrier. In the DL test, in the case that the measurement value 121 of the power of the RF signal 42 transmitted from the O-RU 30 is not equal to the estimated value of the RF power level 107 of the RF signal 42 obtained based on the set value of the total IQ power level 101, it is necessary to investigate the cause. At that time, it is necessary to determine whether the cause of the defect (bug) is on the O-RU 30 (DUT) side or on the measurement device 1 side. The O-DU Emulator 12 of the measurement device 1 transmits data for DL test by the IQ packet 41 to the O-RU 30, which is a DUT, through the fronthaul, and it is necessary to confirm whether or not the IQ packet 41 is normal. In the IQ packet 41, the IQ data is specified for each subcarrier. Therefore, in order to confirm whether the IQ packet 41 is normal or abnormal, it is necessary to confirm not only the total IQ power level 101 of all the subcarriers in the IQ packet 41 but also the IQ power level 106 per one subcarrier in the IQ packet 41, so that the cause of a defect (bug) can be identified quickly and reliably. By this, it is possible to efficiently debug the DUT when conducting the performance test such as O-RAN standard conformance test. It should be noted that in this example, the ATT 18 is not used for simplicity.

Further, in the measurement device 1 of the present embodiment, in the UL test, the control unit 10 is configured to calculate the total IQ power level 205 of all subcarriers in the IQ packet 51 based on the information in the IQ packet 51 received by the O-DU Emulator 12, and calculate the IQ power level 206 per one subcarrier in the IQ packet 51 based on the total IQ power level 205, and the display unit 20 is configured to display the calculated value of the IQ power level 206 per one subcarrier. In the UL test, in the case that the measurement value of the power 221 of the RF signal 52 transmitted to the O-RU 30, obtained by the power measurement instrument 14, that measures the power per one subcarrier and the total power of all subcarriers is not equal to the estimated value of the RF power level 207 of the RF signal 52 received by the O-RU 30, which is calculated by the control unit 10 and, it is necessary to investigate the cause. At that time, it is necessary to determine whether the cause of the defect (bug) is on the O-RU30 (DUT) side or the measurement device 1 side. The O-DU Emulator 12 of the measurement device 1 receives data for UL test by the IQ packet 51 to the O-RU30, which is the DUT, through the fronthaul, and it is necessary to confirm whether or not the IQ packet 51 is normal. In the IQ packet 51, the IQ data is specified for each subcarrier. Therefore, in order to confirm whether the IQ packet 51 is normal or abnormal, it is necessary to confirm not only the total IQ power level 205 of all subcarriers in the IQ packet 51, but also the IQ power level 206 per one subcarrier in the IQ packet 51, so that the cause of the defect (bug) can be quickly and surely identified. By this, it is possible to efficiently debug the DUT when conducting the performance test such as the O-RAN standard conformance test. It should be noted that in this example, the ATT 18 is not used for simplicity.

Further, in the measurement device 1 of the present embodiment, as shown in the FIGS. 4 and 5, the display unit 20 is configured to distinguish and display the total IQ power levels 101, 205 in addition to the IQ power levels 106, 206 per one subcarrier, and display the value 313, 413 set as the upper limit based on the standard for the total IQ power levels 101, 205 together with the total IQ power levels 101, 205. By this configuration, the measurement device 1 of the present embodiment, in the link test of the DUT, can easily determine whether or not the total IQ power level 101, 205 are within the range of the value set as the upper limit, based on the standard without confusing the IQ power level 106, 206 per one subcarrier with the total IQ power level 101, 205.

Further, in the measurement device 1 of the present embodiment, as shown in FIGS. 4, 5, the display unit 20 is configured to display the IQ power levels 106, 206 per one subcarrier, the total IQ power levels 101, 205, the values 313, 413 set as the upper limit based on the standard, the gain 111, 211 set in the O-RU 30, and the measurement values 121 and 221 of the power of the RF signal obtained by the power measurement instrument 14 that measures the power per one subcarrier and the total power of all subcarriers, collectively for each group related to the input and output to the O-RU 30 and measurement. By this configuration, the measurement device 1 of the present embodiment can centrally manage and collectively systematically display information that has been dispersed among components of the measurement device, thereby making it possible to efficiently debug a DUT when conducting a performance test such as O-RAN standard conformance test.

Further, in the measurement device 1 of the present embodiment, the control unit 10 calculates the amplitudes 314, 414 of the IQ signals included in the IQ packets 41, 51, and the display unit 20, as shown in FIGS. 4 and 5, displays the amplitudes 314 and 414 of the IQ signal calculated by the control unit 10. By this configuration, the measurement device 1 of the present embodiment can more accurately identify the cause of the defect when the test result is not normal in the link test of the DUT, so that the DUT can be efficiently debugged.

Further, in the present measurement device 1, the control unit 10 is configured to calculate the sum of the total IQ power level 101 of all the subcarriers in the IQ packet 41 and the DL gain 111 set in the O-RU 30 in the DL test (without ATT 18) as the estimated value of the total RF power level 107 of all subcarriers of the RF signal 42 transmitted from the O-RU 30, and the display unit 20 is configured to further display an estimated value of a total power level 107 of all the subcarriers of the RF signal 42 calculated by the control unit 10, together with the measurement value 121 of the power of the RF signal 42 obtained by the power measurement instrument 14 that measures the power per one subcarrier and the total power of all subcarriers as shown in FIG. 4. By this configuration, in the DL test, the measurement device 1 of the present embodiment can easily compare the estimated value of the total power level 107 of all the subcarriers of the RF signal 42 transmitted from the O-RU30, which is calculated by the control unit 10, and the measurement value 121 of the total power of the RF signal 42 transmitted from the O-RU30, which is measured by the power measurement instrument 14 that measures the power per one subcarrier and the total power of all the subcarriers. By this, the success or failure of the DL test of the DUT can be easily confirmed from the viewpoint of power. It should be noted that in this example, the ATT 18 is not used for simplicity.

Further, in the measurement device 1 of the present embodiment, the control unit 10 is configured to calculate the difference obtained by subtracting the UL gain 211 set in the O-RU 30 from the total IQ power level 205 of all subcarriers in the IQ packet 51 in the UL test (without ATT 18) as the estimated value of the total RF power level 207 of all the subcarriers of the RF signal 52 received by the O-RU 30 and the display unit 20 is configured to display an estimated value of a total RF power level 207 of all the subcarriers of the RF signal 52 received by the O-RU 30, calculated by the control unit 10, together with the measurement value 221 of the total power of the RF signal 52 obtained by the power measurement instrument 14 that measures the power per one subcarrier and the total power of all subcarriers. By this configuration, in the UL test, the measurement device 1 of the present embodiment can easily compare the estimated value of the total power level 207 of all the subcarriers of the RF signal 52 received by the O-RU 30, which is calculated by the control unit 10, and the measurement value 221 of the power of the RF signal 52 transmitted to the O-RU 30, which is measured by the power measurement instrument 14 that measures the power per one subcarrier and the total power of all the subcarriers. By this, the success or failure of the UL test of the DUT can be easily confirmed from the viewpoint of power. It should be noted that in this example, the ATT 18 is not used for simplicity.

Further, in the measurement device 1 of the present embodiment, the control unit 10 determines whether or not the measurement values 121, 221 of the power of the RF signal are equal to the estimated values of the total RF power levels 107, 207 of all subcarriers of the RF signal calculated by the control unit 10, and the display unit 20 displays the result of the determination. By this configuration, the measurement device 1 of the present embodiment can quickly and reliably determine the success or failure of the DUT link test from the viewpoint of power.

In the above embodiment, the description has been given using the component devices compliant with the O-RAN specifications as an example, but the specifications are not limited to the O-RAN specifications, and the present invention can be applied to the test of component devices constituting any network in which communication interfaces between devices are standardized.

INDUSTRIAL APPLICABILITY

As described above, the present invention has the effect of efficiently debugging a DUT when conducting performance test such as O-RAN standard conformance test, and is useful for all measurement devices and measurement methods for testing an O-RU.

EXPLANATION OF REFERENCE NUMERALS

1 Measurement Device
10 Control Unit
12 O-DU Emulator
14 Power Measurement Instrument
16 Signal Generator (SG)
18 Attenuator (ATT)
20 Display Unit
21 Display Screen
22 Operation Unit
24 Storage Unit
30 O-RU

What is claimed is:

1. A measurement device that measures performance of an O-RU (O-RAN Radio Unit) that constitutes a base station of an Open RAN (Open Radio Access Network) that performs orthogonal frequency division multiplexing radio communication, the measurement device including:
- an O-DU Emulator that emulates an O-DU (O-RAN Distributed Unit) of the base station and transmits IQ packets for downlink test to the O-RU through a fronthaul;
- a power measurement instrument that measures power per one subcarrier and total power of all subcarriers of an RF signal generated and outputted based on the IQ packet received by the O-RU;
- a control unit that calculates an IQ power level per one subcarrier in the IQ packet based on a set value of total IQ power level of all the subcarriers in the IQ packet; and
- a display unit that displays the IQ power level per one subcarrier calculated by the control unit.

2. The measurement device according to claim 1, wherein the display unit distinguishes and displays the total IQ power level in addition to the IQ power level per one subcarrier, and displays a value set as an upper limit based on a standard for the total IQ power level, together with the total IQ power level.

3. The measurement device according to claim 2, wherein the display unit displays the IQ power level per one subcarrier, the total IQ power level, a value set as an upper limit based on a standard, a gain set in the O-RU, and the measurement value of the power of the RF signal obtained by a power measurement instrument that measures power per one subcarrier and total power of all subcarriers, collectively for each group related to input and output to the O-RU and measurement.

4. The measurement device according to claim 3, wherein the control unit calculates an amplitude of the IQ signal included in the IQ packet, and
the display unit displays the amplitude of the IQ signal calculated by the control unit.

5. The measurement device according to claim 1, wherein the control unit calculates the sum of the total IQ power level of all the subcarriers in the IQ packet and a downlink gain set in the O-RU as an estimated value of the total power level of all the subcarriers of the RF signal transmitted from the O-RU, and
the display unit further displays an estimated value of a total power level of all the subcarriers of the RF signal calculated by the control unit, together with the measurement value of the power of the RF signal obtained by the power measurement instrument that measures the power per one subcarrier and the total power of all subcarriers.

6. The measurement device according to claim 5, wherein the control unit determines whether or not the measurement value of the power of the RF signal is equal to the estimated value of the total power level of all the subcarriers of the RF signal calculated by the control unit, and
the display unit displays the result of the determination.

7. A measurement device that measures performance of an O-RU that constitutes a base station of an Open RAN (Open Radio Access Network) that performs orthogonal frequency division multiplexing radio communication, the measurement device including:
- a signal generator that generates an RF signal for an uplink test to be transmitted to the O-RU;
- a power measurement instrument that measures power per one subcarrier and total power of all subcarriers of the RF signal generated by the signal generator;
- an O-DU Emulator that emulates the O-DU of the base station and receives the IQ packets from the O-RU that generated IQ packet based on the RF signal through a fronthaul;
- a control unit that calculates a total IQ power level of all subcarriers in the IQ packet based on information of the IQ packet received by the O-DU Emulator and calculates an IQ power level per one subcarrier in the IQ packet based on the total IQ power level; and
- a display unit that displays the IQ power level per one subcarrier calculated by the control unit.

8. The measurement device according to claim 7, wherein the control unit calculates the difference obtained by subtracting the uplink gain set in the O-RU from the total IQ power level of all subcarriers in the IQ packet as an estimated value of total power level of all subcarriers of the RF signal received by the O-RU, and the display unit further displays an estimated value of a total power level of all the subcarriers of the RF signal calculated by the control unit, together with the measurement value of the power of the RF signal obtained by the power measurement instrument that measures the power per one subcarrier and the total power of all subcarriers.

9. The measurement device according to claim 8, wherein the control unit determines whether or not the measurement value of the power of the RF signal is equal to the estimated value of the total power level of all the subcarriers of the RF signal calculated by the control unit, and the display unit displays the result of the determination.

10. The measurement device according to claim 7, wherein the display unit distinguishes and displays the total IQ power level in addition to the IQ power level per one subcarrier, and displays a value set as an upper limit based on a standard for the total IQ power level, together with the total IQ power level.

11. The measurement device according to claim 10, wherein the display unit displays the IQ power level per one subcarrier, the total IQ power level, a value set as an upper limit based on a standard, a gain set in the O-RU, and the measurement value of the power of the RF signal obtained by a power measurement instrument that measures power per one subcarrier and total power of all subcarriers, collectively for each group related to input and output to the O-RU and measurement.

12. The measurement device according to claim 11, wherein the control unit calculates an amplitude of the IQ signal included in the IQ packet, and the display unit displays the amplitude of the IQ signal calculated by the control unit.

13. A measurement method that measures performance of an O-RU that constitutes a base station of an Open RAN (Open Radio Access Network) that performs orthogonal frequency division multiplexing radio communication, the measurement method including:

a transmitting step that emulates an O-DU of the base station and transmits IQ packets for downlink test to the O-RU through a fronthaul;

a measurement step that measures power of an RF signal generated and outputted based on the IQ packet received by the O-RU;

a calculation step that calculates an IQ power level per one subcarrier in the IQ packet based on a set value of total IQ power level of all the subcarriers in the IQ packet; and a display step that displays the IQ power level per one subcarrier calculated by the calculation step on a display unit.

14. The measurement method according to claim 13, wherein the display unit distinguishes and displays the IQ power level per one subcarrier and the total IQ power level, and displays a value set as an upper limit based on a standard for the total IQ power level together with the total IQ power level.

15. The measurement method according to claim 14, wherein the display unit displays the IQ power level per one subcarrier, the total IQ power level, a value set as an upper limit based on a standard, a gain set in the O-RU, and the measurement value of the power of the RF signal obtained by the measurement step that measures power per one subcarrier and total power of all subcarriers of the RF signal, grouped together by groups related to input and output to the O-RU.

16. The measurement method according to claim 15, wherein an amplitude of the IQ signal included in the IQ packet is calculated, and in the display unit, the amplitude of the IQ signal is displayed.

17. The measurement method according to claim 13, wherein the sum of the total IQ power level of all the subcarriers in the IQ packet and a downlink gain set in the O-RU is calculated as the estimated value of the total power level of all the subcarriers of the RF signal sent from the O-RU and in the display unit, the estimated value of a total power level of all the subcarriers of the RF signal is further displayed, together with the measurement value of the power of the RF signal obtained by measuring the power per one subcarrier and the total power of all subcarriers.

18. The measurement method according to claim 17, wherein whether or not the measurement value of the power of the RF signal is equal to the calculated estimated value of the total power level of all subcarriers of the RF signal is determined, and in the display unit, the determination result is displayed.

19. The measurement method according to claim 13, wherein the difference obtained by subtracting the uplink gain set in the O-RU from the total IQ power level of all subcarriers in the IQ packet is calculated as an estimated value of total power level of all subcarriers of the RF signal received by the O-RU, and in the display unit, the estimated value of the total power level of all subcarriers of the RF signal is further displayed, together with the measurement value of the power of the RF signal obtained by measuring the power per one subcarrier and the total power of all subcarriers.

20. The measurement method according to claim 19, wherein whether or not the measurement value of the power of the RF signal is equal to the calculated estimated value of the total power level of all subcarriers of the RF signal is determined, and in the display unit, the determination result is displayed.

21. A measurement method that measures performance of an O-RU that constitutes a base station of an Open RAN (Open Radio Access Network) that performs orthogonal frequency division multiplexing radio communication, the measurement method including:

a generating step that generates an RF signal for an uplink test to be transmitted to the O-RU;

a measurement step that measures the power of the RF signal generated in the generating step;

a receiving step that emulates an O-DU of the base station and receives the IQ packet through a fronthaul from the O-RU that generated the IQ packet based on the RF signal;

a calculation step that calculates the total IQ power level of all subcarriers in the IQ packet based on the information of the IQ packet received in the receiving step, and calculates the IQ power level per one subcarrier in the IQ packet based on the total IQ power level; and a display step that displays the IQ power level per one subcarrier calculated in the calculation step on a display unit.

22. The measurement method according to claim 21, wherein the display unit distinguishes and displays the IQ power level per one subcarrier and the total IQ power level, and displays a value set as an upper limit based on a standard for the total IQ power level together with the total IQ power level.

23. The measurement method according to claim 22, wherein the display unit displays the IQ power level per one subcarrier, the total IQ power level, a value set as an upper limit based on a standard, a gain set in the O-RU, and the measurement value of the power of the RF signal obtained by the measurement step that measures power per one subcarrier and total power of all subcarriers of the RF signal, grouped together by groups related to input and output to the O-RU.

24. The measurement method according to claim 23, wherein an amplitude of the IQ signal included in the IQ packet is calculated, and in the display unit, the amplitude of the IQ signal is displayed.

* * * * *